UNITED STATES PATENT OFFICE.

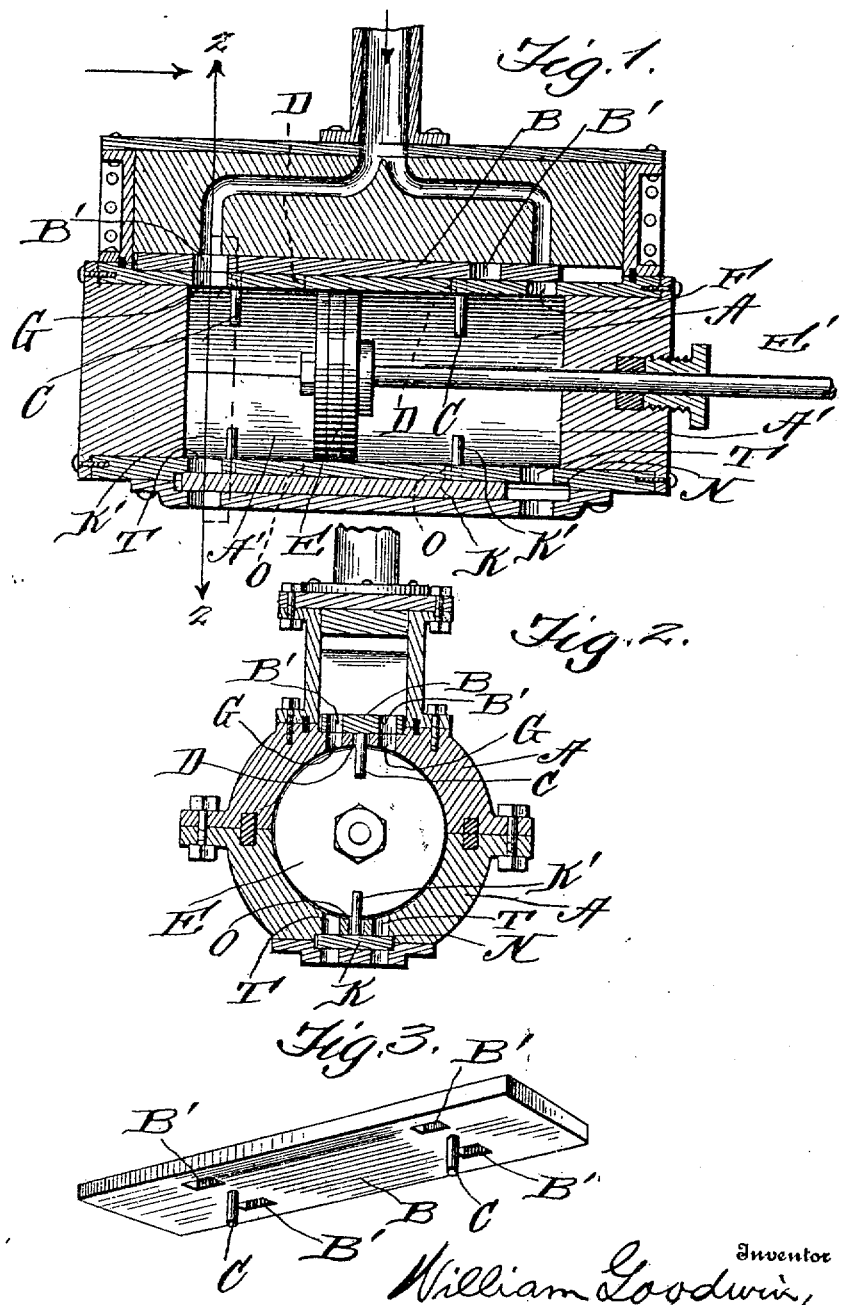

WILLIAM GOODWIN, OF DECATUR, ILLINOIS.

CUT-OFF VALVE FOR ENGINES.

No. 857,457.        Specification of Letters Patent.        Patented June 18, 1907.

Application filed August 18, 1906. Serial No. 331,220.

*To all whom it may concern:*

Be it known that I, WILLIAM GOODWIN, a citizen of the United States, residing at Decatur, in the county of Macon and State of Illinois, have invented certain new and useful Improvements in Cut-Off Valves for Engines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cut-off for engines and comprises various details of construction and combinations and arrangements of parts, which will be hereinafter fully described and then specifically defined in the appended claims.

My invention is illustrated in the accompanying drawings, in which:

Figure 1 is a vertical sectional view centrally through the cylinder of my engine and the cut-off mechanism. Fig. 2 is a cross sectional view and Fig. 3 is a detail view of one of the valves with the lugs projecting therefrom, which work in slots in the cylinder.

Reference now being had to the details of the drawings by letter, A and A' designate two complemental cylinder sections of my engine, which are fastened together with any suitable steam pipe joints. The upper section of the cylinder is provided with an elongated recess formed centrally in the flat surface thereof, in which a general admission valve B is adapted to reciprocate, said valve being provided with the ports B' adjacent to the ends thereof, one upon each side of the lugs C which extend at right angles from the valve B and have play in the slots D, which are formed in the ends of the cylinder section A. E designates the piston which reciprocates within the cylinder and E' the piston stem which works through a suitable packed aperture in one end of the cylinder. Said lugs which project into the interior of the cylinder are adapted to be actuated by one or the other ends of the piston as it reciprocates, whereby the valve may be reciprocated and bring one or the other of the sets of ports in the ends thereof in registration with the ports F and G respectively, in order to allow steam to be fed to one end or the other of the cylinder. The valve K, which is similar in construction to the valve B, reciprocates in a longitudinal recess N formed in the lower section of the cylinder and lugs K' project from the upper surface of the valve N and are guided in the slots O formed in the ends of the lower section of the cylinder. The upper ends of said lugs K' extend into the cylinder, one near each end of the cylinder and adapted to be moved by the piston as it reciprocates in one direction or the other. Exhaust ports T are formed in the lower section of the cylinder and are registered by the valve K as it is moved in one direction or the other.

From the foregoing, it will be noted that, by the provision of the apparatus shown and described, a simple and efficient valve mechanism, actuated by direct contact with the piston, is afforded, the utilization of outside eccentric or other valve-actuated mechanism being entirely dispensed with.

What I claim is:

In combination with a cylinder having portions of its circumference diametrically opposite flattened and terminating in flanges, a plate seated upon the flattened part of the cylinder at its top and bearing against said flanges, said plate having a longitudinal recess in its upper surface, a sliding valve plate mounted in said recess, pins projecting from said valve through slots in the plate and said cylinder, a boxing having flanged ends resting upon the flanges of said plate, said boxing being recessed in its lower end to receive the valve, the ends of the recesses in said boxing and plate being flush, a slotted plate fastened to the flat bottom of the cylinder and engaging the flanges at the ends thereof, the lower surface of said slotted plate having a recess therein, a pin carrying valve mounted in the latter and pins thereon, a plate having a recess in its upper surface fitted to the plate which is fastened to the bottom of the cylinder and adapted to hold said pin carrying plate in position, a piston mounted within the cylinder and adapted as it reciprocates, to contact with the pins of said valve, as set forth.

In testimony whereof I hereunto affix my signature in the presence of two witnesses.

WILLIAM GOODWIN.

Witnesses:
     JOHN E. PATTERSON,
     MARY T. HAHER.